United States Patent

Harvey

[15] 3,677,160
[45] July 18, 1972

[54] COMPACT FILM-PACK CAMERA

[72] Inventor: Donald M. Harvey, Rochester, N.Y.

[73] Assignee: Eastman Kodak Company, Rochester, N.Y.

[22] Filed: Dec. 2, 1970

[21] Appl. No.: 94,360

[52] U.S. Cl. ..................................................95/40
[51] Int. Cl. ........................................G03b 17/04
[58] Field of Search ..........................95/11, 39, 40

[56] References Cited

UNITED STATES PATENTS

| | | | |
|---|---|---|---|
| R25,167 | 5/1962 | Booth et al. | 95/11 X |
| 2,880,658 | 4/1959 | Land et al. | 95/11 |
| 1,184,110 | 5/1916 | Linder | 95/39 |

Primary Examiner—John M. Horan
Attorney—Robert W. Hampton and J. Addison Mathews

[57] ABSTRACT

A self-processing film-pack camera is provided with a cover door having one end hinged to a boxlike camera housing and an opposite end for supporting an objective of the camera. A three-sided light-tight bellows is coupled between the housing and door in a manner permitting movement of the latter between a closed position, wherein the door is substantially parallel to one wall of the housing, and an open position, wherein the door extends outwardly from the housing at an oblique angle. When the door is closed, the bellows is collapsed with its three sides located within the housing laterally adjacent corresponding sides of the housing. Exposed film units are removed from the housing through an opening in a fourth side aligned with an opening in the camera housing. This construction allows the thickness of the closed camera to be reduced in comparison to similar previously known cameras in which a collapsed bellows is located between the film pack and the camera door.

4 Claims, 6 Drawing Figures

Patented July 18, 1972

DONALD M. HARVEY
INVENTOR.

BY

ATTORNEYS

Patented July 18, 1972

DONALD M. HARVEY
INVENTOR.

BY

ATTORNEYS

Patented July 18, 1972  3,677,160

DONALD M. HARVEY
INVENTOR.

BY J. Addison Mathew
R. W. Hampton
ATTORNEYS

COMPACT FILM-PACK CAMERA

BACKGROUND OF THE INVENTION

1. Field of the Invention

The present invention relates to photography and more particularly to self-processing bellows-type cameras.

2. Description of the Prior Art

In recent years, one of the more popular innovations in amateur photography has been the self-processing camera, which, for reasons well known to those skilled in the art, necessarily requires a large-format film and a relatively long objective focal length to provide a reasonably large finished print. Conventional film packs adapted to be used with such cameras comprise a box-like casing provided at one end with an opening through which successive film units can be removed. The film pack is adapted to be received within the camera housing and the camera usually is provided with a collapsible bellows or the like so that the camera lens can be extended from a closed position to an open position to accommodate the relatively long focal length dictated by the large film format.

In most of such cameras, the lens and shutter assembly is carried by a door or lens board member connected to the camera housing by a pleated accordian-type bellows and supported by an appropriate parallelogram linkage so that it remains parallel to the film pack in both its extended and retracted positions. Alternatively, it is also known to support the lens at one end of a door that is hinged to the camera housing at its opposite end and provided with a collapsible folding bellows which allows the lens to be extended by opening the door to an oblique position relative to the housing. In either of these previously known types of cameras, however, the bellows is received between the film pack and the door when the latter is closed. Accordingly, the thickness or forward-to-rearward size of the closed camera must always include the combined thicknesses of the collapsed bellows and the film-pack casing.

SUMMARY OF THE INVENTION

A principle object of the present invention is to improve the compactness of a bellows-type film-pack camera by reducing its thickness or forward-to-rearward size when the camera is in closed condition.

Another object of the invention is to provide a film-pack camera with a simple and aesthetically pleasing bellows which is stored in collapsed condition in lateral relation to the film-pack casing so that the thickness of the closed camera is not limited by the combined thicknesses of the film pack and the collapsed bellows.

These and other objects of the invention are realized in accordance with a preferred embodiment thereof by providing a processing film-pack camera with a cover door that is hinged to the camera housing at one end and which supports the camera lens at its opposite end. A three-sided bellows connects the housing to the door and permits the latter to be moved from a closed position to an oblique open position. When the door is closed, the three sides of the collapsed bellows are located within the housing laterally adjacent the corresponding three sides of the film-pack casing. Exposed film units are removed from the film-pack casing through an opening in its fourth side aligned with a similar opening in the housing.

Various means for practicing the invention and other advantages and novel features thereof will be apparent from the following detailed description of an illustrative preferred embodiment of the invention, reference being made to the accompanying drawings in which like reference numerals denote like elements.

DESCRIPTION OF THE PREFERRED EMBODIMENT

Figures 1, 2:
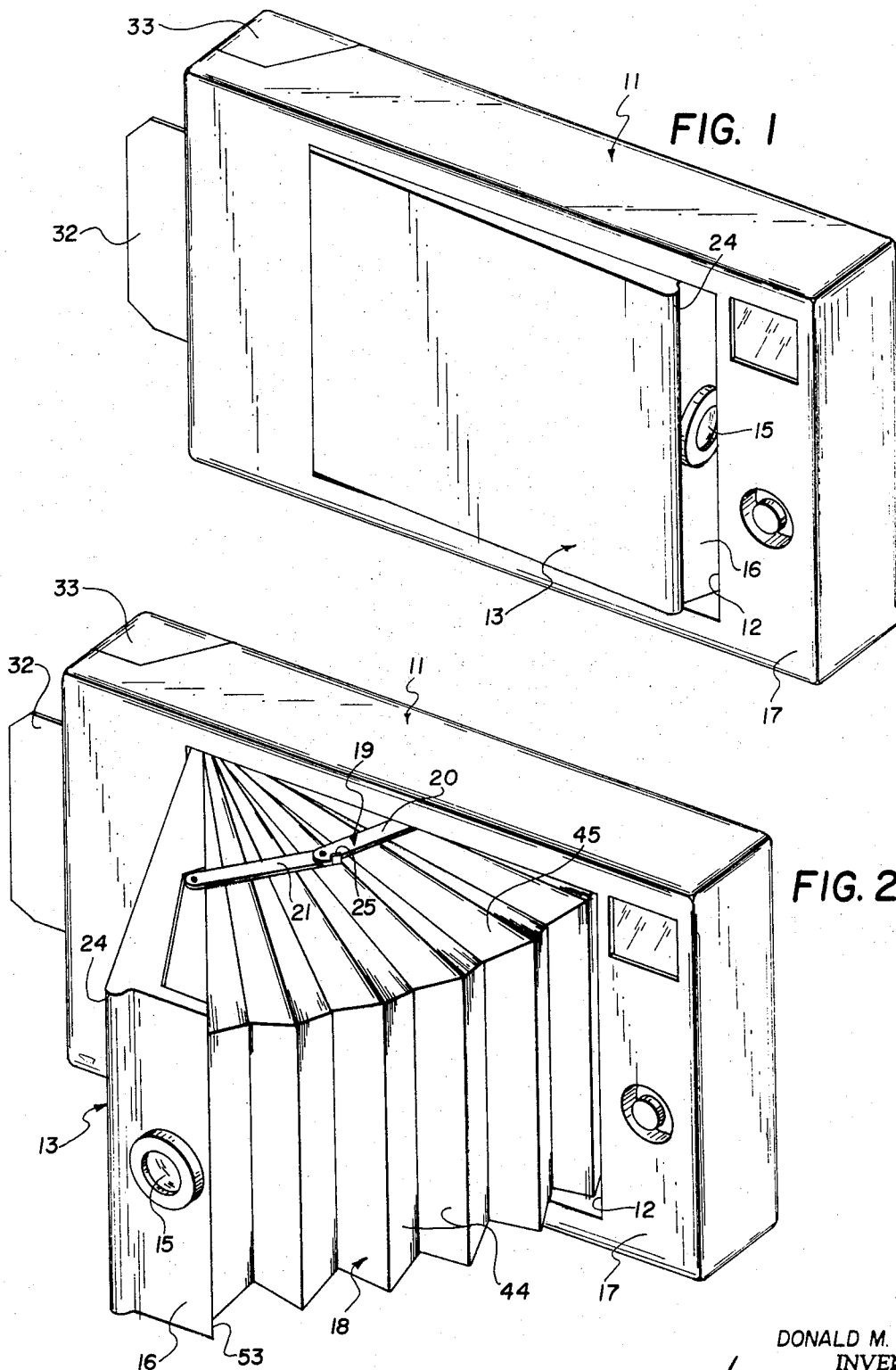
FIG. 1 is a perspective view of a self-processing film-pack camera according to a preferred embodiment of the present invention, which is depicted in closed condition.
FIG. 2 corresponds to FIG. 1 but shows the camera in its open or operative condition.
Figure 4:
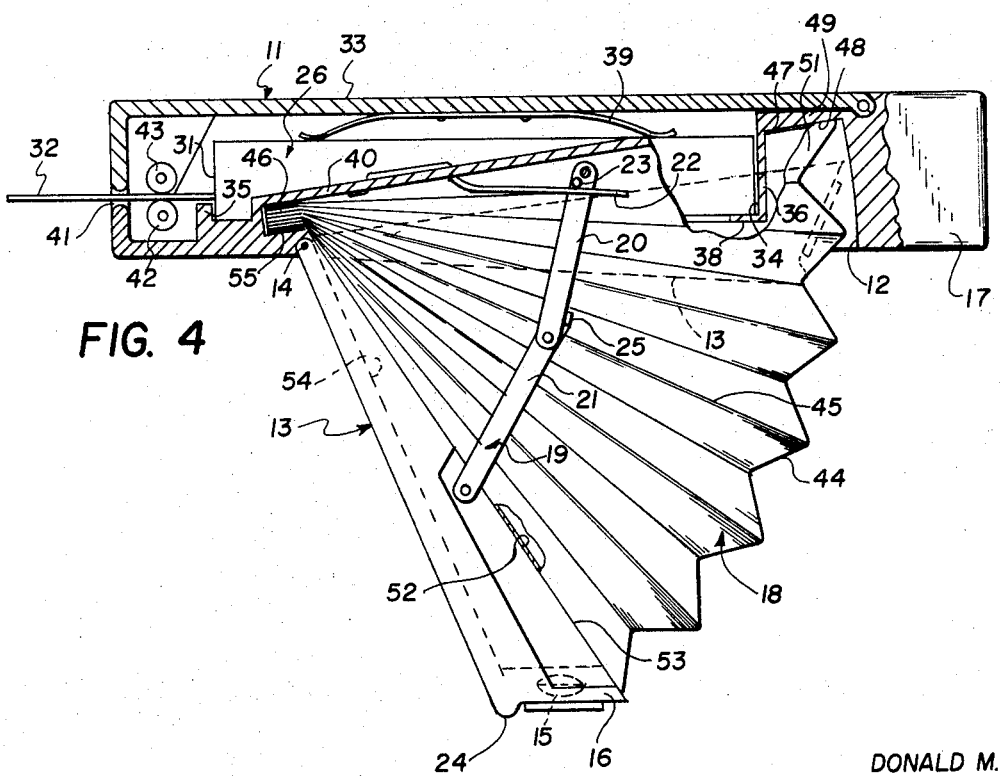
FIG. 4 is a broken away and partially cross-sectioned plan view of the open camera depicted in FIG. 2.

The camera depicted in the accompanying drawings as an illustrative preferred embodiment of the invention comprises a boxlike housing 11 having a forwardly facing opening 12 provided with a lens supporting door 13 coupled to the housing by a hinge 14 (FIG. 4) for movement between a closed position shown in FIG. 1 and an open position shown in FIGS. 2 and 4. The cameras lens 15 and its shutter, not shown, are carried by the sloped end portion 16 of door 13 opposite hinge 14. When the lens support door is in its closed position shown in FIG. 1, it protrudes only slightly beyond the flat front wall 17 of housing 11. Accordingly, the camera can be carried conveniently in the photographer's pocket or in an appropriate carrying case with the lens protected by its reception within opening 12.

The lens support door is connected to the camera housing by a light-tight bellows 18, which is described in greater detail below. A jointed strut 19 comprising pivotally supported legs 20 and 21 extends between the lens support door and the camera housing and is enclosed within the latter when door 13 is closed. A spring wire 22 (FIG. 4) bears against a toggle pin 23 on the rearward strut leg 20 to resiliently maintain the lens support door in its closed position shown in FIG. 1. To open the door, the photographer pulls it forwardly against the resistance of spring 22 by means of the finger grip lip 24 adjacent the camera lens. As the strut unfolds, toggle pin 23 moves along spring wire 22 to a position at which the spring wire biases the strut toward its fully extended position at which ear 25 of the front strut leg engages the adjacent edge of the rear strut leg. Consequently, the fully extended strut locates the lens support door at a predetermined open position in which the lens is in fixed parallel relation to the camera housing. To close the camera, the photographer manually moves the lens support door rearwardly in opposition to spring wire 22, which then resiliently holds the door in its closed position as previously explained.

Figure 3:
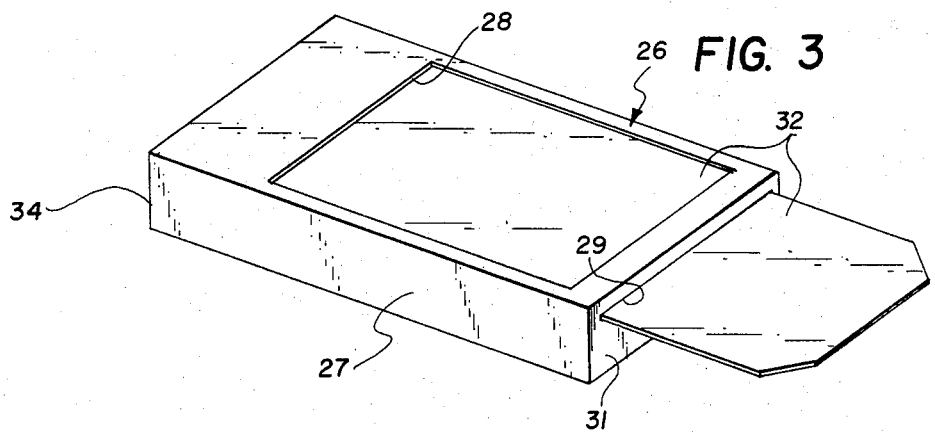
FIG. 3 is a perspective view of a film pack of the type adapted to be accommodated by the camera shown in FIGS. 1 and 2.

The illustrative camera is adapted to be loaded with a film pack 26 of the type illustrated in FIG. 3, which is well known in the photographic art. Briefly, the film pack comprises a box or casing 27 provided with a front exposure opening or window 28 and with a slot 29 in its end wall 31. A plurality of film units are initially stacked inside the casing behind an opaque masking strip 32 that covers the exposure opening and extends out of the casing through slot 29. The film units are provided with respective leader strips and are connected to each other and to the masking strip in such a way that the withdrawal of the masking strip pulls the leader strip of the first available film unit through slot 29 to an accessible position and the withdrawal of each successive film unit similarly brings the leader strip of the next film unit to that same position.

To load the film pack into the camera, the hinged loading door 33 at the rear of the camera housing is opened and the film pack is inserted into a mating compartment 34 in the camera housing which is defined by end walls 35 and 36 joined by tapered lateral walls (not shown). A lip 38 projects inwardly from the end and side walls of compartment 34 and supports the front surface of the film-pack casing surrounding exposure opening 28. When the loading door is latched in its closed position by appropriate latch means, not shown, a leaf spring 39 carried by that door urges the film pack forwardly against lip 38 so that the emulsion surface of the film unit to be exposed is positioned in coincidence with a focal plane of the extended camera lens.

Figure 5:
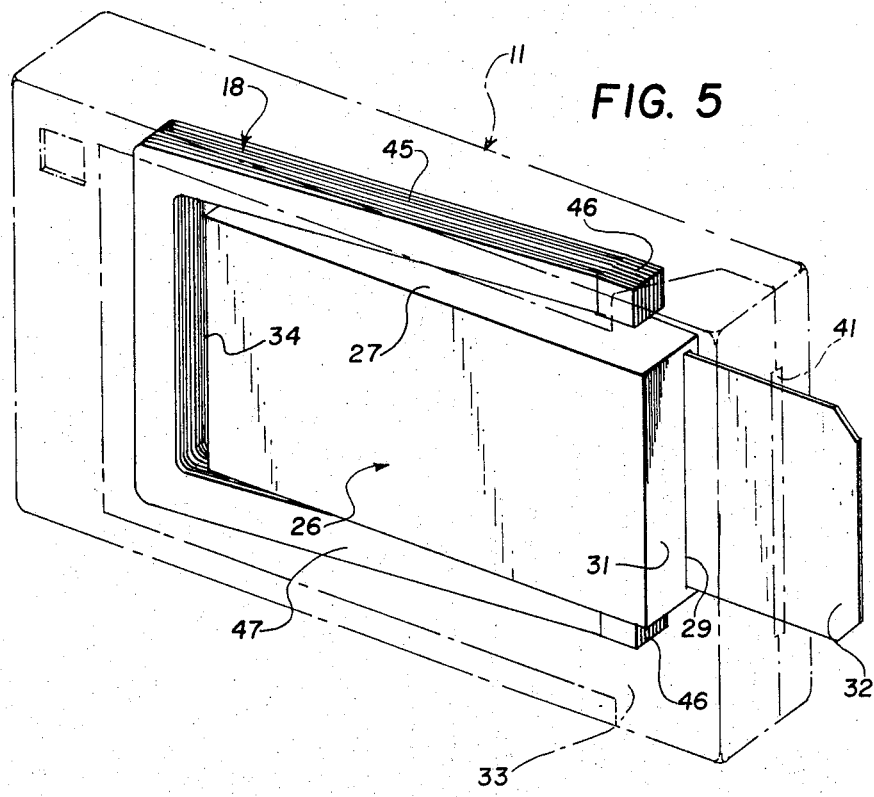
FIG. 5 is a perspective rear view showing the illustrative camera in phantom lines and depicting the relation of the bellows to the film pack when the camera is in its closed condition depicted in FIG. 1.
Figure 6:
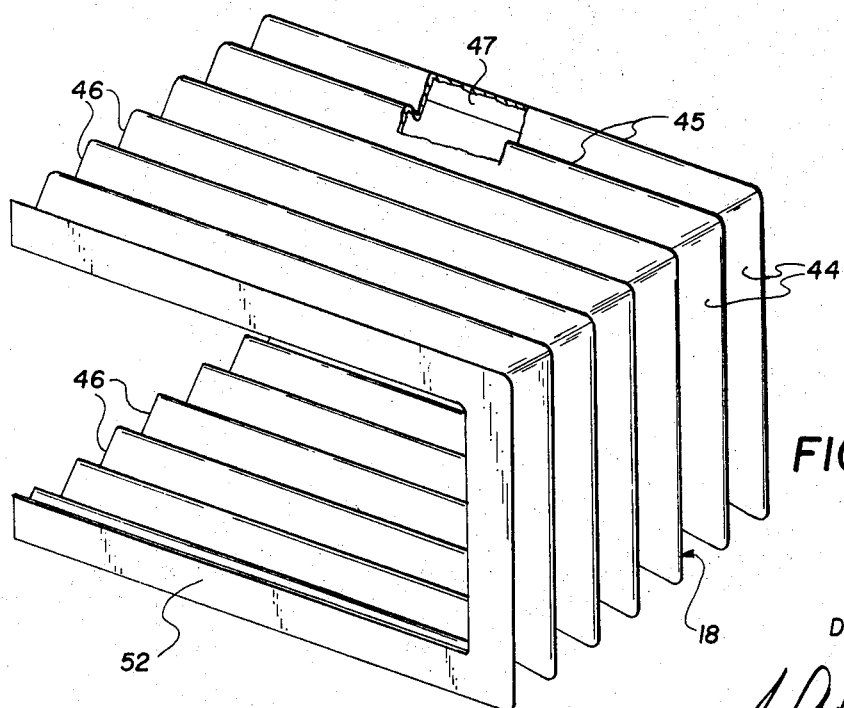
FIG. 6 is a perspective view of the bellows before it is installed in the illustrative camera.

When the film pack is positioned in the camera as described above, the leader end of the opaque masking strip extends past compartment end wall 35 and through an exit slot 41 provided between the adjacent confronting edges of the loading door and the camera housing. Inside the closed camera housing, the strip passes between a pressure roller 42 mounted to the housing and an opposing pressure roller 43 carried by the loading door. By pulling on the externally accessible end of the masking strip, the photographer can remove that strip from the camera and thereby bring the leader strip of the first available film unit to the same accessible position. After each film unit has been exposed, it is withdrawn by means of its accessible leader strip, as previously described, and is thereby pulled between the opposed pressure rollers, which rupture a fluid container and distribute the processing fluid over the exposed photosensitive sheet surface in the manner well known in the self-processing camera art. The camera bellows 18 is preferably made of a flexible opaque plastic material such as polypropylene and is molded or otherwise formed in one piece. As best shown in FIG. 5, the bellows is of generally U-shaped profile comprising a thin accordian pleated wall 44 joining similar accordian plated walls 45. Because its fourth side is open, the illustrative bellows obviously can be formed in a relatively simple two-part mold comprising a cavity which defines the external bellows surfaces and a core or plug which defines the internal bellows surfaces. Alternatively, the bellows might be made from a single piece of sheet plastic material by employing a pressure or vacuum forming technique.

After the bellows has been formed, it is squeezed to a collapsed condition and the free ends 46 of its lateral walls are cemented together or otherwise permanently held in that condition so that they can no longer expand and contract in accordian fashion. The bellows is then installed in the camera with its end face 47 cemented to the confronting face 48 of a flat support web 49 which defines the back wall of a forwardly facing U-shaped recess 51 surrounding three sides of the film-pack compartment. The opposite end face 52 of the bellows is similarly cemented to a rearwardly facing flat U-shaped surface 53 surrounding three sides of recess 54 in the lens support door. A strip of flexible opaque material 55 or the equivalent is also cemented between the hinged end of the cover door and the camera housing to provide a light seal at the door hinge. Thus, it should be readily apparent that completely light-tight cooperation is provided between the camera housing and the lens support door so that only light entering through lens 15 can reach the photosensitive film.

When the lens support door is in its closed position, as shown in broken lines in FIG. 4, the film pack is partially received within door recess 54 and the bellows is collapsed into the U-shaped housing recess 51. As best illustrated in FIG. 5, the collapsed bellows therefore lies almost entirely in lateral relation to the film pack and thus allows the closed camera to be considerably thinner than analogous prior art cameras in which the collapsed bellows is stored forwardly of the film pack.

Although the preferred embodiment of the invention employs a one-piece accordian pleated plastic bellows, it should be apparent that the bellows could be made in the conventional manner by cementing stiffening members to a piece of flexible opaque fabric. Also, it should be recognized that the bellows need not necessarily be of the accordian type but could comprise a plurality of U-shaped wall members pivotally connected at their free ends and adapted to telescope relative to each other.

The invention has been described in detail with particular reference to a preferred embodiment thereof, but it will be understood that variations and modifications can be effected within the spirit and scope of the invention.

I claim:
1. A processing camera for use with a pack of self-processing film units; the pack including a disposable casing having a forward wall and side walls extending generally perpendicular to the forward wall, the forward wall defining an exposure aperture permitting the exposure of film units in the casing and one of the side walls defining an exit aperture permitting the withdrawal of film units from the casing; said camera comprising:
   a bellows translatable between an extended condition defining a hollow generally wedge-shaped configuration, and a collapsed condition defining a hollow generally rectangular configuration, said generally rectangular configuration being of U-shaped cross section including three side walls and one open side;
   a housing including means for receiving said bellows in said collapsed condition and for receiving the pack within said U-shaped cross section, said means aligning the exit aperture of the pack with said open end of said U-shaped cross section to permit the withdrawal of film from the pack through said open end.

2. A processing camera as claimed in claim 1, wherein the pack has an end portion including the exit aperture, and said means for receiving said bellows and the pack aligns the end portion to extend through said open side of said bellows in said collapsed condition of said bellows.

3. A folding camera adapted to be loaded with a generally rectangular film pack; the film pack including a casing provided with a forward wall having an exposure window, a first end wall, and a second opposite end having an opening through which successive film units can be removed from the film pack; said camera comprising:
   a housing;
   a lens;
   a door having one end carrying said lens, and another end hinged to said housing for movement of said door between closed and open positions relative to said housing;
   a light-tight bellows extending between said door and said housing, said bellows including a first wall member opposite said hinged end of said door, and two other wall members joined with said first wall member, said wall members forming a generally U-shaped cross-sectional configuration that is open adjacent said hinged end and that is collapsible by movement of said door to said closed position; and
   chamber defining means for receiving a substantial portion of said bellows within said housing and for positioning a substantial portion of the film pack within said bellows, said means positioning said film pack with the first end wall located adjacent said first wall member whereby the film units can be withdrawn from said bellows where it is open adjacent said hinged end.

4. A folding camera as claimed in claim 3, wherein said housing includes means for receiving and protecting said lens in said closed position of said door.

* * * * *